(12) United States Patent
Bilotti

(10) Patent No.: US 8,630,996 B2
(45) Date of Patent: Jan. 14, 2014

(54) IDENTIFYING DUPLICATE ENTRIES IN A HISTORICAL DATABASE

(75) Inventor: David Bilotti, Benicia, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1695 days.

(21) Appl. No.: 11/122,390

(22) Filed: May 5, 2005

(65) Prior Publication Data

US 2006/0253426 A1   Nov. 9, 2006

(51) Int. Cl.
*G06F 7/00* (2006.01)
*G06F 17/30* (2006.01)

(52) U.S. Cl.
USPC ............................ 707/710; 707/664; 707/692

(58) Field of Classification Search
USPC .............................................. 707/200, 104, 2
See application file for complete search history.

(56) References Cited

U.S. PATENT DOCUMENTS

| | | | | |
|---|---|---|---|---|
| 5,717,915 A | * | 2/1998 | Stolfo et al. | 707/5 |
| 5,832,068 A | * | 11/1998 | Smith | 379/114.14 |
| 6,052,693 A | * | 4/2000 | Smith et al. | 707/104.1 |
| 6,138,113 A | * | 10/2000 | Dean et al. | 707/2 |
| 6,246,997 B1 | * | 6/2001 | Cybul et al. | 705/27 |
| 6,457,006 B1 | * | 9/2002 | Gruenwald | 707/7 |
| 6,532,480 B1 | * | 3/2003 | Boothby | 707/201 |
| 7,013,310 B2 | * | 3/2006 | Messing et al. | 707/104.1 |
| 2002/0013786 A1 | | 1/2002 | Machalek | |
| 2002/0091688 A1 | * | 7/2002 | Decary et al. | 707/6 |
| 2003/0065544 A1 | * | 4/2003 | Elzinga et al. | 705/8 |
| 2003/0126156 A1 | * | 7/2003 | Stoltenberg et al. | 707/104.1 |
| 2004/0003005 A1 | * | 1/2004 | Chaudhuri et al. | 707/200 |
| 2004/0139072 A1 | * | 7/2004 | Broder et al. | 707/4 |
| 2004/0199541 A1 | | 10/2004 | Goldberg et al. | |
| 2004/0249789 A1 | * | 12/2004 | Kapoor et al. | 707/2 |
| 2005/0055380 A1 | | 3/2005 | Thompson et al. | |
| 2005/0065944 A1 | * | 3/2005 | Gunther et al. | 707/100 |
| 2006/0047629 A1 | * | 3/2006 | Gabbert et al. | 707/2 |

* cited by examiner

*Primary Examiner* — Augustine K Obisesan
(74) *Attorney, Agent, or Firm* — Guntin & Gust, PLC; Andrew Gust

(57) ABSTRACT

A data management system (102) has a memory (102B-C), and a processor (102A) coupled thereto. The processor is programmed to extract (206) historical data from a historical database according to predetermined extraction criteria, search (208) for one or more potential duplicate entries in the historical data according to a portion of selection criteria used for generating the historical database, and submit (214) a notification when one or more potential duplicate entries have been identified.

20 Claims, 2 Drawing Sheets

100

IDENTIFYING DUPLICATE ENTRIES IN A HISTORICAL DATABASE

FIELD OF THE INVENTION

This invention relates generally to historical tracking methods, and more particularly to identifying duplicate entries in a historical database.

BACKGROUND OF THE INVENTION

Today information management has become a critical, if not essential, aspect to successfully conducting business. Customer Relationship Management (CRM) systems and other like applications are being used to track information relating to customers, employees, supply chain, payroll, purchase orders, and numerous other traceable items just to mention a few. An important function of data collection is processing reports, analyzing data organized by these reports, and taking action as a measure of continuously improving productivity, cost, quality, and overall operations of the enterprise. As data collection systems grow, the amount of information collected and the central processing resources required to process this information can be substantial.

It is quite common for enterprises to utilize an on-line system for collecting information in real-time, and an off-line system for extracting historical data to generate reports for analysis. During the transfer process from the on-line system to off-line system, it is common for anomalies to occur such as, for example, an error in database indexing, failed CPU processes due to limited disk space, memory allocation errors in the on-line and/or the off-line systems, communication errors between systems causing a severance in communication, and so on. These errors can in turn disrupt the information extraction process such that duplicate entries or records may result.

This a common problem experienced by large enterprises. To work around this issue, human analysts are utilized to scan historical information collected by the off-line system to remove duplicate entries. Without this function, the possibility stands that misleading reports might be provided to management, which in turn can have an adverse effect on business operations as decisions are made in reliance of the accuracy of such reports. Although the function of the analysts is very important, the scanning process is costly and often prone to human error.

SUMMARY OF THE INVENTION

Embodiments in accordance with the invention provide a method and apparatus for identifying duplicate entries in a historical database.

In a first embodiment of the present invention, a computer-readable storage medium has computer instructions for extracting historical data from a historical database according to predetermined extraction criteria, searching for one or more potential duplicate entries in the historical data according to a portion of selection criteria used for generating the historical database, and submitting a notification when one or more potential duplicate entries have been identified.

In a second embodiment of the present invention, a data management system has a memory, and a processor coupled thereto. The processor is programmed to extract historical data from a historical database according to predetermined extraction criteria, search for one or more potential duplicate entries in the historical data according to a portion of selection criteria used for generating the historical database, and submit a notification when one or more potential duplicate entries have been identified.

In a third embodiment of the present invention, a method in a data management system includes the steps of extracting historical data from a historical database according to predetermined extraction criteria, searching for one or more potential duplicate entries in the historical data according to a portion of selection criteria used for generating the historical database, and submitting a notification when one or more potential duplicate entries have been identified.

DETAILED DESCRIPTION OF THE DRAWINGS

Figure 1:
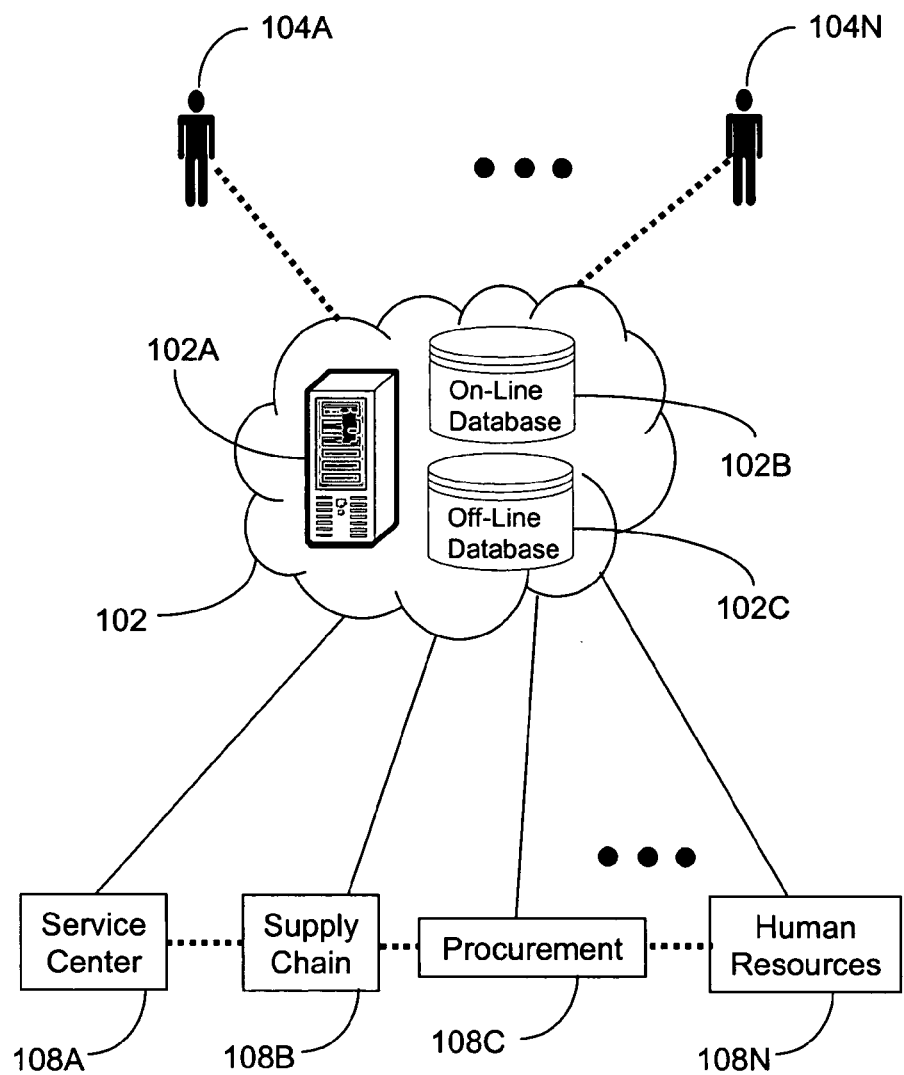
FIG. 1 is block diagram of an enterprise utilizing a data management system according to an embodiment of the present invention.

While the specification concludes with claims defining the features of embodiments of the invention that are regarded as novel, it is believed that the embodiments of the invention will be better understood from a consideration of the following description in conjunction with the figures, in which like reference numerals are carried forward.

FIG. 1 is block diagram of an enterprise 100 utilizing a data management system 102 according to an embodiment of the present invention. The data management system 102 utilizes conventional technology such as a processor 102A and a memory 102B-C. The processor 102A can be one or more conventional computers or servers. The memory 102B-C utilizes a conventional media device (such as a high capacity disk drive) for storage purposes and can be used in the present application as a database for managing data collected by the enterprise. Although the processor 102A and memory 102B-C are shown separately, they can be in the alternative an integral unit. It will also be appreciated that the memory 102B-C can alternatively use other media storage types such as floppy disks, CD-ROMs, Flash memories, non-volatile ROM, and/or RAM.

The data management system 102 is coupled to a conventional communication system (not shown) such as a PSTN (Public Switched Telephone Network), IP (Internet Protocol) network, and/or a wireless communication network. The data management system 102 is coupled by way of the communication system to any number of data collection points of the enterprise 100 such as a service center 108A, supply chain 108B, procurement 108C, and human resources 108N, just to name a few.

The collection of data can be substantial, and continuous. For very large enterprises, for example, millions of collectable updates can occur on a daily basis. As such, very large conventional and replaceable memory 102B-C subsystems may be required. The data management system 102 can communicate with enterprise personnel 104A-N through conventional communication links of the communication system. Accordingly, the communication system provides the data management system 102 a means to notify analysts 104 of an event, as well as provides the analysts a means to extract and analyze information regarding the operational performance of the enterprise 100.

Figure 2:
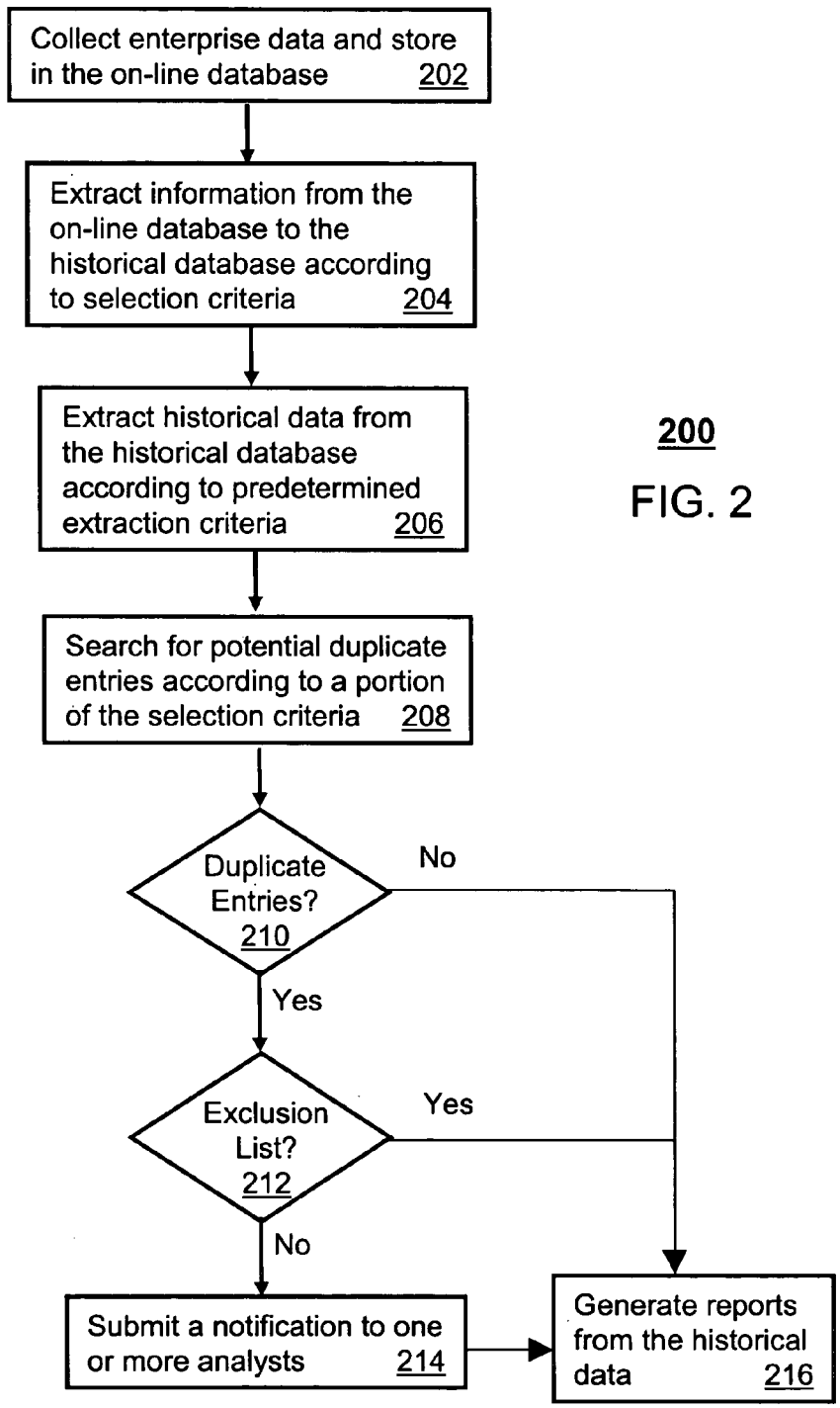
FIG. 2 depicts a flow chart of a method operating in the data management system according to an embodiment of the present invention.

FIG. 2 depicts a flow chart of a method 200 operating in the data management system 102 according to an embodiment of the present invention. Method 200 begins with step 202 where the data management system 102 collects enterprise data and stores said data in an on-line database 102B. The on-line database 102B collects any information relevant to operations of the enterprise 100. Any conventional software application can be utilized for executing this step such as, for example, CRM (Customer Relationship Management) systems supplied by SAP, Peoplesoft, Oracle, and Microsoft, among others.

In step 204, information is extracted from the on-line database 102B and directed to the off-line database 102C (herein referred to as the historical database 102C) according to selection criteria established by personnel from the enterprise 100. This step can be performed any number of times (daily, weekly or monthly). Each time the extraction step is executed, however, the information collected by the historical database 102C is additive. That is, information from prior extraction steps is augmented by information from subsequent extractions. The selection criteria can be of any operational significance to enterprise management, and can be updated periodically as circumstances change.

In heavily congested systems requiring extensive memory and processing resources of the data management system 102, duplicate entries/records may arise from anomalies (e.g., failed jobs, memory allocation issues, etc.) occurring at the time of extraction step 204. Consequently, duplicate entries can work there way into operational reports that overstate or understate results, which in turn can lead to misguided decisions by enterprise management.

Method 200 can apply steps 206 through 216 to substantially eliminated such misrepresentations. In step 206, historical data of interest is extracted from the historical database according to predetermined extraction criteria. The extraction criteria can be as broad or as narrow as desired. For instance, an analyst may choose to extract information relating to employees of a particular function in all regions of the United States for the month of January 2005. Alternatively, the analyst can choose to extract narrower information such as for employees with IDs ranging from 100 to 500 in the Texas region for the first week of January 2005. In step 208, a search is performed for potential duplicate entries according to a portion of the selection criteria of step 204. That is, the broad selection criteria used for employees in step 204 is narrowed down to a portion relating to employees included in the historical data extracted in step 206. Based on this portion of the selection criteria, in step 208 duplicate entries can be searched an identified at any abstraction level that may be relevant to the analyst.

If in step 210 duplicate entries are not found, then method 200 terminates, and the analyst proceeds to step 216 where s/he can generate a report on the historical data. If, however, a duplicate entry is found, then in step 212 said entry is compared to an exclusion list. The exclusion list can be defined by analysts to identify one or more acceptable duplicate entries. Which duplicate entries can be considered acceptable versus unacceptable can depend on the operational design of the enterprise 100. Thus, if in step 212 an entry identified in step 210 as a potential duplicate is found to be an acceptable duplicate, then the analyst can proceed to step 216 for generating operational reports. If, however, the potential duplicate entries are not identified in the exclusion list, then a notification is submitted in step 214 to one or more analysts.

Selecting one or more analysts can be based on the expertise or experience of an analyst in managing particular data groups of the enterprise 100, availability of the analyst, or the type of selection criteria chosen in step 206. Additionally, any means of communication can be used for notifying the selected analyst(s) of potential duplication errors. For instance, notifications can be by email, short message services (SMS) of conventional cellular systems, conventional paging systems, or any other conventional form of notification. The analyst in turn makes a final determination whether the potential duplicate entries identified in steps 208-212 are to be removed or maintained in the historical data extracted in step 206. Once the analyst completes the screening the original or updated historical data is submitted to step 216.

Method 200 as described substantially reduces, if not eliminates, the human errors typically involved with a purely manual screening process.

It should be evident by now that the present invention can be realized in hardware, software, or a combination of hardware and software. Moreover, the present invention can be realized in a centralized fashion, or in a distributed fashion where different elements are spread across several interconnected processors. Any kind of computing device or other apparatus adapted for carrying out method 200 described above is suitable for the present invention.

Additionally, the present invention can be embedded in a computer program product, which comprises all the features enabling the implementation of method 200, and which when loaded in a computer system is able to carry out these methods as computer instructions. A computer program in the present context means any expression, in any language, code or notation, of a set of instructions intended to cause a system having an information processing capability to perform a particular function either directly or after either or both of the following: a) conversion to another language, code or notation; b) reproduction in a different material form.

It should be also evident that the present invention may be used for many applications. Thus, although the description is made for particular arrangements and methods, the intent and concept of the invention is suitable and applicable to other arrangements and applications not described herein. For example, method 200 can be reduced to steps 202, 204, 206, 208 and 214. In yet another embodiment, method 200 can be further reduced to steps 206, 208, and 214. Neither of these embodiments departs from the claimed invention. It would be clear therefore to those skilled in the art that there are many potential modifications that can be affected on the disclosed embodiments without departing from the spirit and scope of the invention.

Accordingly, the described embodiments ought to be construed to be merely illustrative of some of the more prominent features and applications of the invention. It should also be understood that the claims are intended to cover the structures described herein as performing the recited function and not only structural equivalents. Therefore, equivalent structures that read on the description should also be construed to be inclusive of the scope of the invention as defined in the following claims. Thus, reference should be made to the following claims, rather than to the foregoing specification, as indicating the scope of the invention.

What is claimed is:

1. A non-transitory computer-readable storage medium, the storage medium comprising computer instructions for:
   generating a historical database by extracting information from an on-line database according to selection criteria;
   extracting historical data from the historical database according to predetermined extraction criteria;
   searching for one or more potential duplicate entries in the historical data according to a portion of the selection criteria used for generating the historical database, wherein the potential duplicate entries arise from anomalies in the generation of the historical database;

submitting a notification when one or more potential duplicate entries have been identified; accessing an exclusion list; and excluding from the searching one or more acceptable duplicate entries as identified by the exclusion list.

2. The non-transitory storage medium of claim 1, further comprising computer instructions for notifying a party of said one or more potential duplicate entries; receiving inputs associated with the exclusion list; and modifying the exclusion list based on the inputs.

3. The non-transitory storage medium of claim 1, further comprising computer instructions for generating the on-line database by collecting information associated with operation of an enterprise, wherein the on-line database receives the information from the enterprise via at least one of a Internet Protocol network, a Public Switched Telephone network and a wireless communication network.

4. The non-transitory storage medium of claim 1, further comprising computer instructions for selecting one or more parties from a plurality of analysts.

5. The non-transitory storage medium of claim 1, wherein said notification is performed according to at least one among a group of notification options comprising an email notification and a wireless message notification.

6. The non-transitory storage medium of claim 1, wherein the predetermined extraction criteria comprise an abstraction of information of the historical database.

7. The storage medium of claim 1, wherein the predetermined extraction criteria is a portion of the selection criteria used for generating the historical database.

8. A data management system, comprising:
a memory; and
a processor coupled to the memory, wherein the processor is programmed to:
extract historical data from a historical database according to predetermined extraction criteria;
search for one or more potential duplicate entries in the historical data according to a portion of selection criteria used for generating the historical database;
store an exclusion list; and
submit a notification when one or more potential duplicate entries have been identified,
wherein the processor is further programmed to exclude from the search one or more acceptable duplicate entries as identified by the exclusion list.

9. The data management system of claim 8, wherein the processor is further programmed to notify a party of said one or more potential duplicate entries; receive inputs associated with the exclusion list; and modify the exclusion list based on the inputs.

10. The data management system of claim 8, wherein the processor is further programmed to generate the historical database by extracting information from an on-line database according to the selection criteria, and wherein the potential duplicate entries arise from anomalies in the extracting of the historical data.

11. The data management system of claim 8, wherein the processor is further programmed to select one or more parties from a plurality of analysts.

12. The data management system of claim 8, wherein said notification is performed according to at least one among a group of notification options comprising an email notification and a wireless message notification.

13. The data management system of claim 8, wherein the predetermined extraction criteria is a portion of the selection criteria used for generating the historical database.

14. The data management system of claim 8, wherein the predetermined extraction criteria comprise an abstraction of information of the historical database.

15. A method in a data management system, comprising the steps of:
generating a historical database by extracting information from an on-line database according to selection criteria;
extracting historical data from the historical database according to predetermined extraction criteria;
obtaining an exclusion list that identifies one or more acceptable duplicate entries;
searching for one or more potential duplicate entries in the historical data according to a portion of the selection criteria used for generating the historical database, wherein the one or more acceptable duplicate entries are excluded from the searching; and
submitting a notification when one or more potential duplicate entries have been identified.

16. The method of claim 15, further comprising the step of notifying a party of said one or more potential duplicate entries.

17. The method of claim 15, further comprising the step of generating the historical database by extracting information from an on-line database according to the selection criteria, wherein the potential duplicate entries arise from anomalies in the extracting of the historical data.

18. The method of claim 15, further comprising the steps of:
selecting one or more parties from a plurality of analysts;
the one or more parties identifying and removing one or more duplicate entries from the historical data; and
generating at least one report from the updated historical data.

19. The method of claim 15, wherein said notification is performed according to at least one among a group of notification options comprising an email notification and a wireless message notification.

20. The method of claim 15, wherein the predetermined extraction criteria is a portion of the selection criteria used for generating the historical database.

* * * * *